Aug. 11, 1959 C. D. SIMMONS 2,899,601

WAVE GENERATOR

Filed Nov. 21, 1955 2 Sheets-Sheet 1

INVENTOR.
CHARLES D. SIMMONS
BY
Beelen V. Hazeltine
ATTORNEY

INVENTOR.
CHARLES D. SIMMONS
BY
[signature]
ATTORNEY

United States Patent Office 2,899,601

Patented Aug. 11, 1959

2,899,601

WAVE GENERATOR

Charles D. Simmons, Philadelphia, Pa., assignor to Philco Corporation, Philadelphia, Pa., a corporation of Pennsylvania Application November 21, 1955, Serial No. 548,019

9 Claims. (Cl. 315—27)

This invention relates to wave generators, and more particularly to generators of aperiodic waves characterized in that during the major portion of each cycle the wave amplitude varies in one direction at a relatively low rate, and during the minor portion of the cycle the amplitude varies in the opposite direction at a high rate. Such a wave is useful, for example, for deflection of the electron beam of a cathode ray tube.

Deflection wave generators for use with cathode ray tubes are now widely used; for example, such generators are used in television receivers to produce the required scanning motion of the electron beam in the picture tube. In general, prior deflection wave generators have required large amounts of energy and have been rather complex. For example, the so-called "fly-back" type of deflection wave generating system, commonly used in television receivers, inherently consumes a large amount of energy, since all of the deflection current must flow through vacuum tubes used as switches. The system is complex because separate switch tubes must be used to control the yoke current on the first and second halves of the slow rise portion of the cycle, because a transformer is necessary to effect current balance, and because a separate drive signal source is required to time the system.

It has been proposed heretofore to provide for deflection wave generation by means of an oscillator employing a resonant circuit. For example, it has been proposed to provide a dynatron type oscillator modified to produce the desired wave form. However, such prior proposals have not been entirely satisfactory for one reason or another.

Accordingly, one object of the present invention is to provide an aperiodic wave generator which overcomes the objections of prior devices.

A particular object of this invention is to provide a highly efficient device for the production of a wave of suitable form for beam deflection purposes.

Another object of the invention is to provide such a device which is relatively simple and therefore inexpensive.

Other objects and features of the invention will be apparent from the description to follow.

In accordance with this invention, an aperiodic wave of the form hereinbefore mentioned is produced with minimum expenditure of energy by means of a novel oscillatory circuit employing a non-linear capacitor whose varying capacity enables efficient production of a wave generally of the desired form. With such a circuit, it is necessary only to supply sufficient energy thereto to supply the losses of the circuit, as it will oscillate as long as the lost energy is replenished. In the preferred form of the circuit, as hereinafter described, a non-linear inductor is employed to impart greater linearity to the generated wave.

Thus, the present invention provides a novel oscillatory circuit which is adapted to produce an aperiodic wave solely by virtue of the character of the circuit components, and which requires only that energy be supplied to it from an external source to supply the circuit losses and to sustain the oscillations.

The required energy may be supplied to the oscillatory circuit in any suitable manner. Thus, according to one embodiment of the invention, the oscillatory circuit is employed as the oscillatory element of a class C oscillator which, as well known, can be made to approach 100% efficiency. In another embodiment of the invention, the required energy may be supplied to the oscillatory circuit through the medium of a pulse-triggered tube.

The invention may be fully understood from the following detailed description with reference to the accompanying drawings, wherein Fig. 1 shows in simple form an oscillatory circuit provided according to this invention;

Figure 1:
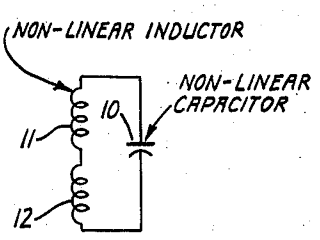

Referring more particularly to the drawings, Fig. 1 shows a simple oscillatory circuit according to the preferred form of this invention, comprising a non-linear capacitor 10 and a non-linear inductor 11 serially included in the circuit. It may be assumed that it is desired to produce an aperiodic current in a coil 12 which is also included serially in the circuit.

Figure 2:
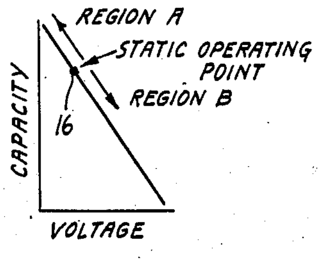
Fig. 2 shows the general capacity vs. voltage characteristic of the non-linear capacitor employed in the circuit.
Figure 3:
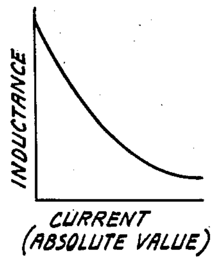
Fig. 3 shows the general inductance vs. current characteristic of the non-linear inductor employed in the circuit.

Fig. 2 shows the general capacity vs. voltage characteristic of the non-linear capacitor 10, while Fig. 3 shows the general inductance vs. current characteristic of the non-linear inductor 11.

Figure 4:
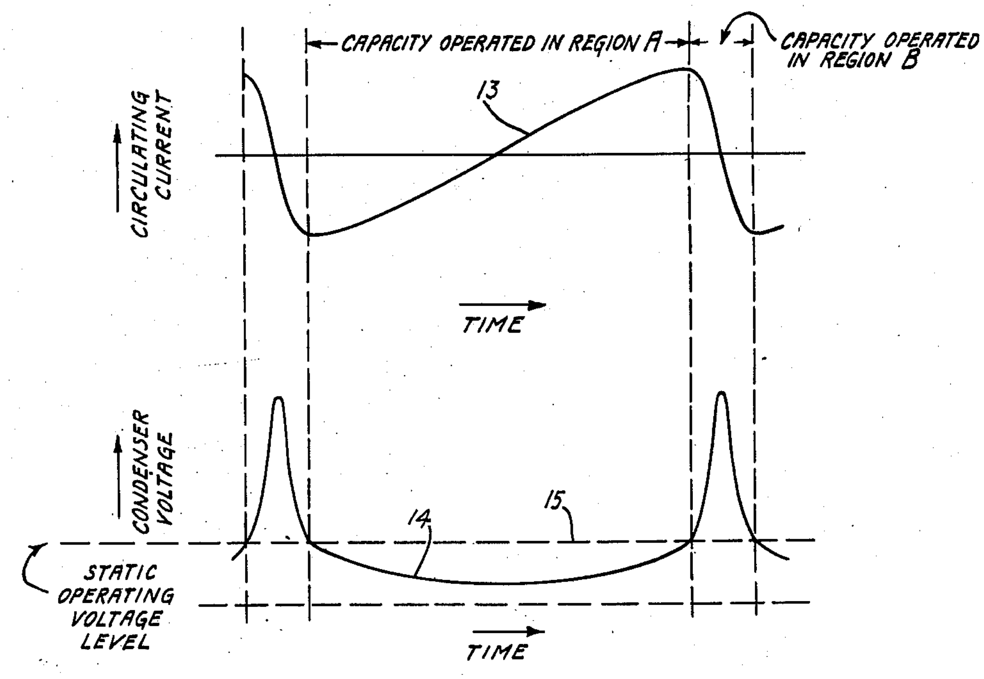
Fig. 4 shows graphically the form of the circulating current and also that of the capacitor voltage.

If the circuit of Fig. 1 is excited to oscillation, the current therein will be of the aperiodic form shown at 13 in Fig. 4. The circuit will continue to produce such current as long as the losses of the circuit are supplied from an external source. Curve 14 in Fig. 4 shows how the voltage across the non-linear capacitor varies during each cycle with respect to a static operating voltage level represented by broken line 15. As hereinafter described, this voltage level is established by applying a D.-C. bias voltage to the capacitor. This voltage establishes a static operating point 16 on the capacity vs. voltage characteristic shown in Fig. 2.

As may be seen from curve 14, during the major portion of each cycle, the capacitor voltage is low and therefore the capacity is high, being in region A of Fig. 2. Consequently a partial low frequency oscillation takes place and produces the gradually rising portion of the current wave 13. Then, as the capacitor voltage rises abruptly well above level 15, the capacity decreases in region B of Fig. 2, and a partial high frequency oscillation takes place and produces the abrupt decline of the current wave.

Further, during operation of the circuit the non-linear inductor 11 serves to impart linearity to the current wave. Were it not for the inductor, the rate of current change would be relatively low in the outer portions of the rising part of the wave and relatively high near the zero axis. However, when the current has a high value, either positive or negative, the inductance of element 11 is low; and when the current is low, the inductance of element 11 is high. The varying electrical inertia of element 11 tends to make the rate of current change more uniform.

Figure 5:
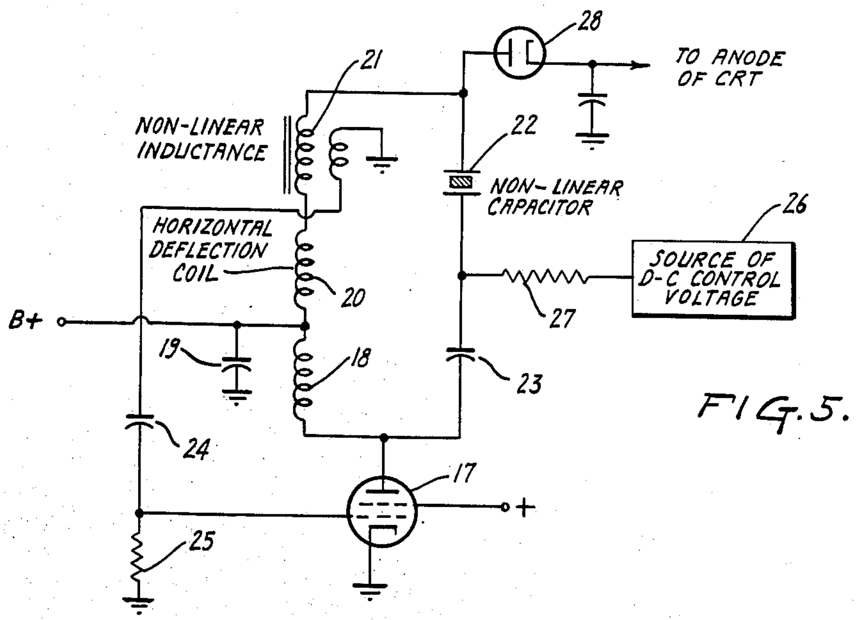
Fig. 5 is a diagrammatic illustration of an aperiodic wave generator embodying the present invention, wherein the oscillatory circuit is employed as the tank circuit of a class C oscillator.

Referring now to Fig. 5, there is shown a deflection wave generator in which the above-described oscillatory circuit is employed as the tank circuit of a class C oscillator. The arrangement shown comprises a grid-controlled tube 17, shown as a tetrode, having its cathode grounded and having its plate connected through an inductance 18 to the usual voltage source B+, the usual by-pass condenser being provided at 19. It is assumed that the system is to be employed for horizontal deflection in a television receiver, and the oscillatory circuit includes, in addition to inductance 18, the horizontal deflection coil 20, a non-linear inductor 21, a non-linear capacitor 22, and a capacitor 23, all in series. Coupling between the output and input circuits of tube 17 is provided by the condenser 24 and resistor 25. The time constant of these elements is selected to give suitable grid biasing for class C operation of the oscillator.

The static operating point for the non-linear capacitor 22 is established by means of a D.-C. control voltage applied from a suitable source 26 through a resistor 27 of large value connected to a point between capacitors 22 and 23. The latter capacitor is of much greater capacity than capacitor 22. The repetition rate of oscillation, i.e., the frequency of the aperiodic current wave 13 (Fig. 4) is determined by the static operating point of the non-linear capacitor 22. This point is dependent upon the value of the D.-C. control voltage in relation to the B+ voltage, since the difference between these voltages determines the normal or static voltage across the non-linear capacitor.

Where the system is a free running oscillator, the source 26 may comprise simply a D.-C. voltage source and manually-adjustable means for varying the magnitude of the D.-C. voltage. For example, a battery and a potentiometer could be employed. Where it is desired to effect continuous control of the frequency of the oscillator, the source 26 may be a suitable source of voltage for such control. For example, if it were desired to synchronize the oscillator with horizontal sync pulses, a phase detector could be employed to compare the frequency of the deflecting current wave with the frequency of the sync pulses and to effect control of the oscillator to maintain synchronism thereof with the synch pulses.

During the rapid current change portion of the operating cycle, the voltage across capacitor 22 rises to a high value as shown in Fig. 4. The pulses may be peak rectified by diode 28 to provide high voltage for the second anode of the cathode ray tube. Of course, this is optional and it will be understood that any power consumed by the high voltage circuit must be supplied to the oscillatory circuit.

In the system of Fig. 5, amplitude limiting of the aperiodic current wave may be achieved by causing substantial drop of the plate voltage of tube 17 and substantial screen current flow during conduction by the tube. To this end, the value of inductance 18 may be selected to effect the desired drop of plate voltage, and the voltage applied to the screen may be selected to effect the desired screen current flow.

Figure 6:
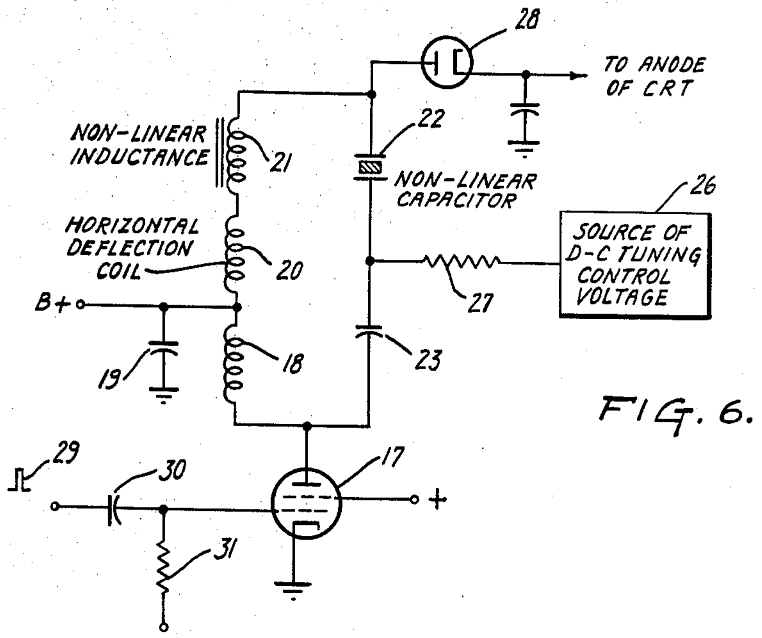
Fig. 6 is a diagrammatic illustration of an aperiodic wave generator embodying this invention, wherein energy is supplied to the oscillatory circuit through the medium of a pulse-triggered tube.

Fig. 6 shows a system similar to that of Fig. 5 except that tube 17 is rendered intermittently conductive by input pulses, such as shown at 29, supplied through condenser 30 to the grid of tube 17 which in this instance is provided with a grid return resistor 31 connected to a source of bias potential. Thus, in this instance, energy is supplied intermittently to the oscillatory circuit through intermittent flow of plate current produced by input pulses which may be sync pulses. The operating frequency will be determined by the timing of the input pulses. The resonant circuit is tuned to the incoming pulse frequency by varying the D.-C. control voltage of source 26.

In the practice of this invention, any suitable non-linear elements may be employed as the principal elements of the oscillatory circuit. Non-linear inductors in the form of saturable reactors are well known, and such an element may be employed as the non-linear inductor in this circuit. Non-linear capacitors, e.g., those employing barium titanate as the dielectric, are also known and are available for use. In experimental work in connection with this invention, a Type VSR capacitor manufactured by Mucōn Corporation of Newark, New Jersey, was employed.

While certain specific embodiments of the invention have been illustrated and described for the purpose of disclosure, it will be apparent that the invention may be practiced in various forms and embodiments other than those illustrated. Accordingly, it will be understood that the scope of the invention is defined by the appended claims and is not to be limited by the exemplary embodiments herein described.

I claim:

1. Apparatus for producing a current wave which during a major portion of each cycle varies in amplitude in one direction at a relatively low rate and during a minor portion of each cycle varies in amplitude in the opposite direction at a relatively high rate, said apparatus comprising an oscillatory circuit including a capacitor and an inductor in series, said capacitor being characterized in that its capacity varies in inverse relation to its voltage, means for supplying energy to said circuit to effect sustained oscillation thereof and thereby produce a current wave therein, and means for applying a control voltage to said capacitor to control the frequency of said current wave, whereby during operation the voltage across said capacitor varies about a level established by said control voltage and the capacity of said capacitor varies in inverse relation to the voltage variation about a value also established by said control voltage, and during each operating cycle said current wave comprises a partial low frequency oscillation and a partial high frequency oscillation due to the variation of said capacity about said value.

2. Apparatus according to claim 1, wherein said inductor is characterized in that its inductance varies in inverse relation to the current therethrough, whereby said current wave is caused to be more linear.

3. Apparatus according to claim 1, wherein the means for supplying energy to said circuit comprises an oscillator whereof said circuit is the tank circuit.

4. Apparatus according to claim 3, further including means for effecting class C operation of said oscillator.

5. Apparatus according to claim 1, wherein the means for supplying energy to said oscillatory circuit comprises an energy-supply circuit to which said oscillatory circuit is coupled, and means for rendering said energy-supply circuit intermittently operative.

6. A magnetic deflection system for a cathode ray tube, comprising an oscillatory circuit including a deflection coil, a capacitor and an inductor, all in series, said capacitor being characterized in that its capacity varies in inverse relation to its voltage, means for supplying energy to said circuit to effect sustained oscillation thereof and thereby produce a current wave therein, and means for applying a control voltage to said capacitor to control the frequency of said current wave, whereby during operation the voltage across said capacitor varies about a level established by said control voltage and the capacity of said capacitor varies in inverse relation to the voltage variation about a value also established by said control voltage, and during each operating cycle said current wave comprises a partial low frequency oscillation and a partial high frequency oscillation due to the variation of said capacity about said value.

7. A magnetic deflection system according to claim 6, wherein said inductor is characterized in that its inductance varies in inverse relation to the current therethrough, whereby the deflection current wave produced in said deflection coil is caused to be more linear.

8. Apparatus for producing a current wave which during a major portion of each cycle varies in amplitude in one direction at a relatively low rate and during a minor portion of each cycle varies in amplitude in the opposite direction at a relatively high rate, said apparatus comprising an oscillatory circuit including a capacitor and an inductor in series, said capacitor being characterized in that its capacity varies in inverse relation to its voltage, said inductor being characterized in that its inductance varies in inverse relation to the current therethrough, and means for supplying energy to said circuit to effect a sustained oscillation thereof and thereby produce a current wave therein, the variation of said capacity causing each cycle of said current wave to comprise a partial low frequency oscillation and a partial high frequency oscillation, and the variation of said inductance causing said current wave to be more linear.

9. A magnetic deflection system for a cathode ray tube, comprising an oscillatory circuit including a deflection coil, a capacitor and an inductor, all in series, said capacitor being characterized in that its capacity varies in inverse relation to its voltage, said inductor being characterized in that its inductance varies in inverse relation to the current therethrough, and means for supplying energy to said circuit to effect sustained oscillation thereof and thereby produce a current wave therein, the variation of said capacity causing each cycle of said current wave to comprise a partial low frequency oscillation and a partial high frequency oscillation, and the variation of said inductance causing said current wave to be more linear.

References Cited in the file of this patent

UNITED STATES PATENTS

| | | |
|---|---|---|
| 2,179,607 | Bedford | Nov. 14, 1939 |
| 2,241,762 | Blumlein | May 13, 1941 |
| 2,416,215 | Rath | Feb. 8, 1947 |
| 2,461,307 | Antalek | Feb. 8, 1949 |
| 2,473,556 | Wiley | June 21, 1949 |
| 2,677,799 | Foster | May 4, 1954 |
| 2,761,090 | Thalner | Aug. 28, 1956 |
| 2,788,446 | Cerveny | Apr. 9, 1957 |

OTHER REFERENCES

Donley: "Effect of Field Strength on Dielectric Properties of Barium Strontium Titanate," RCA Review, vol. VIII, September 1947, pages 539–553.